(12) United States Patent
Hatano

(10) Patent No.: US 6,952,234 B2
(45) Date of Patent: Oct. 4, 2005

(54) IMAGE PICKUP APPARATUS AND METHOD FOR BROADENING APPARENT DYNAMIC RANGE OF VIDEO SIGNAL

(75) Inventor: Kazuhiko Hatano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,767

(22) Filed: Feb. 27, 1998

(65) Prior Publication Data

US 2003/0133035 A1 Jul. 17, 2003

(30) Foreign Application Priority Data

Feb. 28, 1997 (JP) .............................. 9-045698

(51) Int. Cl.$^7$ ........................ H04N 5/238; H04N 5/235; H04N 5/228

(52) U.S. Cl. ............... 348/363; 340/229.1; 340/208.99; 340/221.1

(58) Field of Search ................................ 348/229, 230, 348/296, 297, 298, 299, 208, 221, 363, 559, 229.1, 230.1, 208.1, 208.99, 208.13, 221.1, 226.1; 396/52, 55

(56) References Cited

U.S. PATENT DOCUMENTS

| | | | | |
|---|---|---|---|---|
| 4,272,787 A | * | 6/1981 | Michael et al. | 348/559 |
| 5,162,914 A | * | 11/1992 | Takahashi et al. | 348/229 |
| 5,235,427 A | * | 8/1993 | Kim | 348/208 |
| 5,949,481 A | * | 9/1999 | Sekine et al. | 348/208 |
| 6,130,709 A | * | 10/2000 | Sekine et al. | 348/208 |

* cited by examiner

Primary Examiner—Wendy R. Garber
Assistant Examiner—Luong T Nguyen
(74) Attorney, Agent, or Firm—Fitzpatrick, Cella, Harper & Scinto

(57) ABSTRACT

An image pickup method and an image pickup apparatus are provided which can pick up an image with a broad substantial dynamic range even with a video camera or the like which is likely to be subject to image shifts. In increasing an apparent dynamic range of a video signal by synthesizing a single image from a plurality of images sequentially picked up at different exposure amounts, if a difference between a motion vector between pixels in a plurality of images and a motion vector between images is larger than a predetermined threshold value, the pixel is not used for synthesization. Even a video signal having an image shift caused by a motion of an object itself or hand vibration can be subjected to a practically usable dynamic range increasing process.

5 Claims, 13 Drawing Sheets

| FIELD | T (THROUGH) | M (MEMORY) |
|---|---|---|
| ODD | Th 1 | Th 2 |
| EVEN | Th 2 | Th 1 |

BASIC CHARACTERISTIC

THRESHOLD VALUE CHANGE

OPERATION CHANGE

SHUTTER SPEED CHANGE

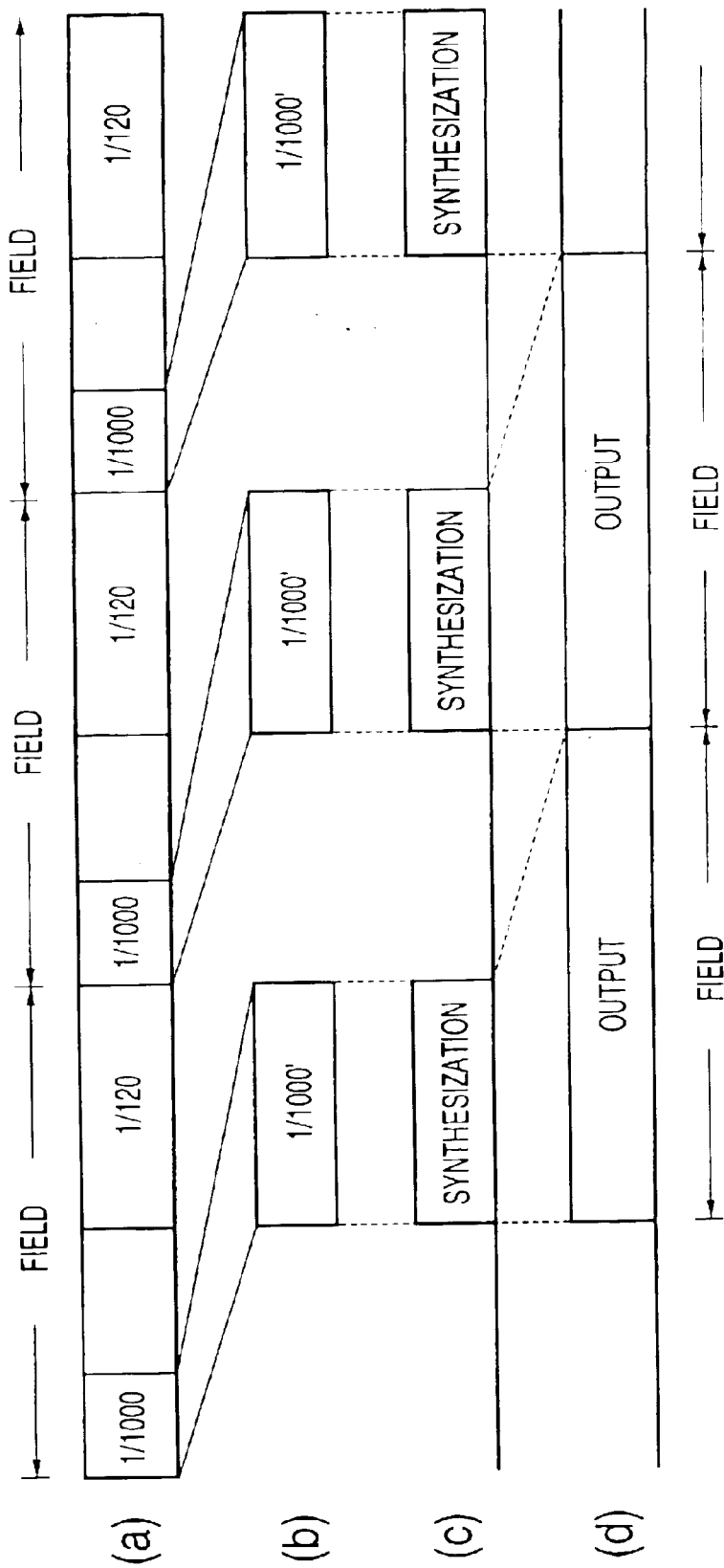

IMAGE PICKUP APPARATUS AND METHOD FOR BROADENING APPARENT DYNAMIC RANGE OF VIDEO SIGNAL

BACKGROUND OF THE INVENTION

1. Field of the Invention

The present invention relates to an image pickup method and an image pickup apparatus capable of broadening an apparent dynamic range of a video signal.

2. Related Background Art

Image pickup devices are used widely as an image pickup unit of VTRs with a built-in camera, still video cameras and the like. An image pickup apparatus using an image pickup tube of a video camera or a solid image pickup element has a dynamic range narrower than that of silver-salt photographing systems, and is therefore associated with some problems of "crushed white" with lost tonal levels in a bright portion and "crushed black" with lost tonal levels in a dark portion, under rear light or in other cases.

If such a case occurs with, for example, a video camera, a user increases an exposure amount of a main object with "crushed black" by manually controlling the iris or operating upon a rear light correction button to open the iris by about two steps.

Even if a proper exposure amount is obtained for the main object through rear light correction, the background has "crushed white" and becomes only white. Therefore, with a conventional image pickup apparatus, proper adjustment only of the exposure amount for a main object does not solve a problem of a narrow dynamic range of the image pickup apparatus.

In order to solve the problem of "crushed white" and "crushed black", in an image pickup apparatus which uses a line scanner or the like for the conversion of a still image into electrical signals, a single image is synthesized from a plurality of images of the same object picked up at different exposure amounts.

In the case of such an image pickup apparatus taking only a still image, the positional relation between an object and the apparatus is fixed. Therefore, there is no shift between images although they are picked up at different timings, so that there is no practical problem even if a single image is synthesized from a plurality of images.

However, in the case of an image pickup apparatus such as a video camera or a still video camera, the above-described image pickup method cannot be applied reliably because the positional relation between an object and the apparatus may change minutely because of hand vibration or the like.

In such a case, the position of each of a plurality of images of the same object picked up at different timings has a small shift. Therefore, a single image synthesized from these images has the object with an image shift such as double or triple objects. This becomes a serious issue for recent compact and light video cameras which are likely to have hand vibration.

SUMMARY OF THE INVENTION

In consideration of the above-described problems, an object of the present invention is to provide an image pickup method and an image pickup apparatus capable of picking up an image with a broad substantial dynamic range without image shift, even with video cameras or still video cameras which are likely to be subject to image shifts.

According to one aspect of the present invention, there is provided an image pickup method of increasing an apparent dynamic range of a video signal by synthesizing a single image from a plurality of images sequentially picked up at different exposure amounts, wherein a motion vector of a video signal is detected, and if the detection result indicates that the motion vector is larger than a predetermined threshold value, image synthesization is not performed.

According to another aspect of the present invention, there is provided an image pickup method of increasing an apparent dynamic range of a video signal by synthesizing a single image from a plurality of images sequentially picked up at different exposure amounts, comprising: a motion vector detecting step of detecting a motion vector between corresponding pixels in the plurality of images; a vector difference detecting step of detecting a difference between a motion vector detected at the motion vector detecting step and a motion vector between the plurality of images; a comparison step of comparing the detection result of the vector difference detecting step with a predetermined threshold value; and a synthesization inhibiting step of inhibiting the image synthesization if the comparison result at the motion vector comparison step is larger than the predetermined threshold value.

According to another aspect of the present invention, there is provided an image pickup method of increasing an apparent dynamic range of a video signal by synthesizing a single image from a plurality of images sequentially picked up at different exposure amounts, comprising: a motion vector detecting step of detecting a motion vector between corresponding pixels in the plurality of images; a vector difference detecting step of detecting a difference between a motion vector detected at the motion vector detecting step and a motion vector between the plurality of images; a comparison step of comparing the detection result of the vector difference detecting step with a predetermined threshold value; a coordinate converting step of performing a coordinate conversion of the plurality of images in correspondence with an image shift caused by a time difference when the plurality of images are picked up, if the comparison result at the motion vector comparison step is smaller than the predetermined threshold value; and an image synthesizing step of synthesizing the plurality of images with the image shift corrected at the coordinate converting step, into a single image.

According to another aspect of the invention, there is provided an image pickup apparatus for increasing an apparent dynamic range of a video signal by synthesizing a single image from a plurality of images sequentially picked up at different exposure amounts, comprising: motion vector detecting means for detecting a motion vector of the video signal; comparison means for comparing the detection result by the vector difference detecting means with a predetermined threshold value; and synthesization inhibiting means for inhibiting the image synthesization if the comparison result by the comparison means is larger than the predetermined threshold value.

According to another aspect of the invention, there is provided an image pickup apparatus for increasing an apparent dynamic range of a video signal by synthesizing a single image from a plurality of images sequentially picked up at different exposure amounts, comprising: motion vector detecting means for detecting a motion vector between corresponding pixels in the plurality of images; vector difference detecting means for detecting a difference between a motion vector detected by the motion vector detecting means and a motion vector between the plurality of images; comparison means for comparing the detection result by the vector difference detecting means with a predetermined threshold value; coordinate converting means for performing a coordinate conversion of the plurality of images in correspondence with an image shift caused by a time difference when the plurality of images are picked up, if the comparison result by the motion vector comparison means is smaller than the predetermined threshold value; and image synthesizing means for synthesizing the plurality of images with the image shift corrected by the coordinate converting means, into a single image.

The invention provides the above-described technical aspects. Therefore, in increasing an apparent dynamic range of a video signal by synthesizing a single image from a plurality of images sequentially picked up at different exposure amounts, if a difference between a motion vector between pixels in a plurality of images and a motion vector between images is larger than a predetermined threshold value, the pixel is not used for synthesization. Even a video signal having an image shift caused by a motion of an object itself or hand vibration can be prevented from forming a double or triple images of an object.

Other objects, features and advantages of the invention will become apparent from the following detailed description taken in conjunction with the accompanying drawings.

BRIEF DESCRIPTION OF THE DRAWINGS

FIG. 8 is a timing chart illustrating the operation of an image pickup device.

DETAILED DESCRIPTION OF THE PREFERRED EMBODIMENTS

An image pickup method and an image pickup apparatus according to preferred embodiments will be described in detail with reference to the accompanying drawings.

Figure 1:
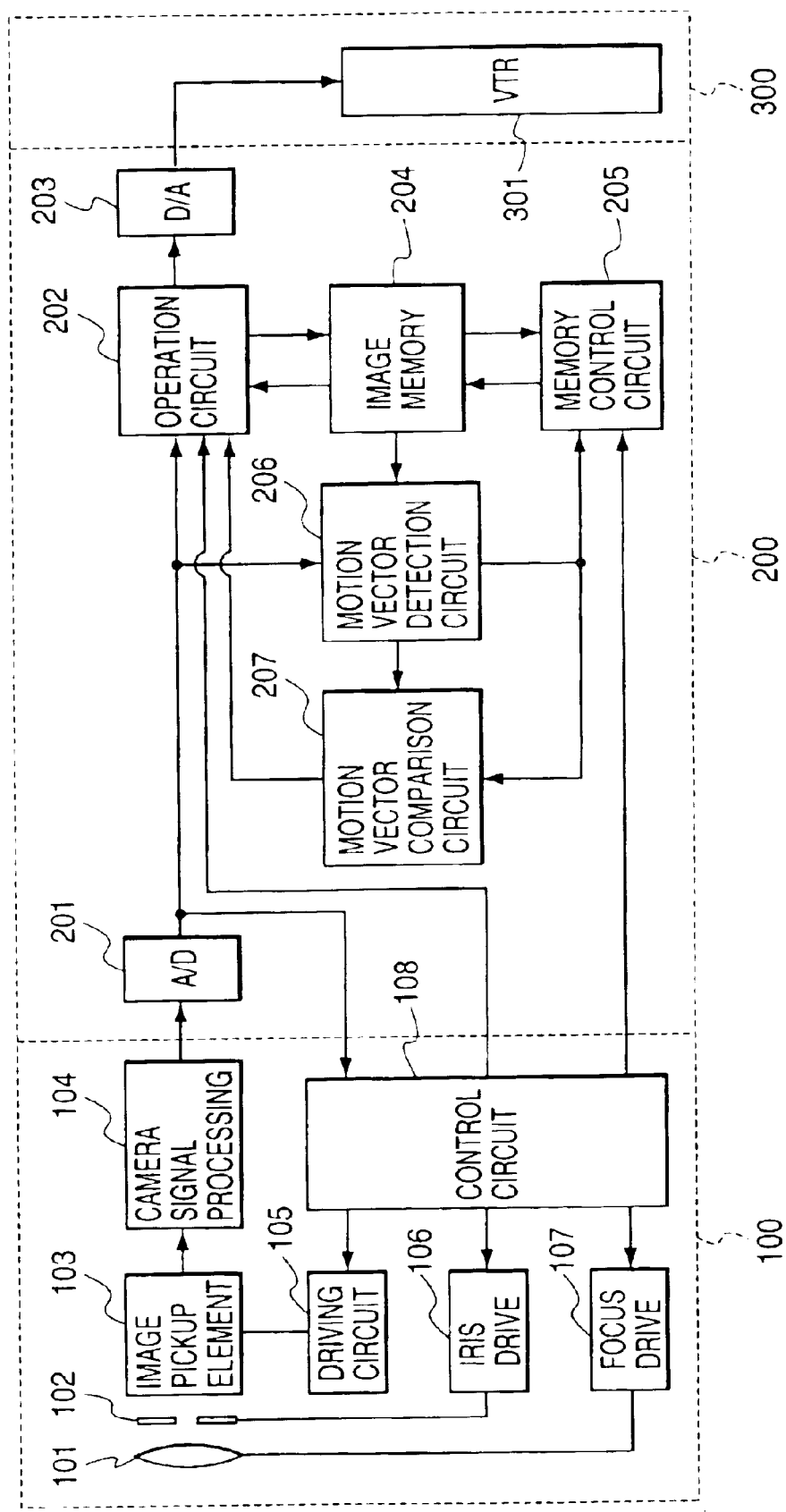
FIG. 1 is a block diagram showing the structure of a VTR with a built-in camera embodying the present invention.

FIG. 1 is a block diagram showing the overall structure of a VTR with a built-in camera embodying the present invention.

In FIG. 1, reference numeral 100 denotes a camera unit, reference numeral 200 denotes a processing unit, and reference numeral 300 denotes a recording unit. In the camera unit 100, light incident upon an optical system 101 is controlled in amount by an iris 102 and focussed on an image pickup device (element) 103.

The image pickup device 103 is made of semiconductor elements such as MOSs and CCDs. An optical image focussed on the focal plane of the image pickup device 103 is converted into electrical video signals to generate a video signal to be output.

A focus drive circuit 107, an iris drive circuit 106 and an image pickup device drive circuit 105 for controlling a light accumulation time or the like drive the optical system 101, iris 102, and image pickup device 103, under the control of a camera control circuit 108. A camera signal processing circuit 104 performs a gamma correction process or other known processes, similar to a signal processing circuit of a general video camera.

The video signal output from the camera unit 100 is an analog signal which is supplied to the processing unit 200 and converted into a digital signal by an A/D converter 201. Pixel data of the converted digital signal is then converted by an operation (computing) circuit 202 in a manner to be described later. Thereafter, the converted pixel data is converted back into an analog signal by a D/A converter 203 and supplied to the recording unit 300.

Reference numeral 204 denotes an image memory which is used by the operation circuit 202 and a motion vector detection circuit 206 for data calculation. Reference numeral 205 denotes a memory control circuit for controlling the operation of the image memory 204. The memory control circuit 205 outputs read/write address signals of the image memory 204 in response to a timing signal supplied from the camera control circuit 108 of the camera unit 100.

The memory control circuit 205 also outputs an address signal for frame position alignment, according to an output from the motion vector detection circuit 206, when images are synthesized by correcting an image shift.

A motion vector comparison circuit 207 compares a motion vector of each pixel detected by the motion vector detection circuit 206 with a motion vector between images calculated from the motion vector of each pixel. If a difference of the motion vector of each pixel from the motion vector between images is equal to or larger than a predetermined threshold value, position information of each pixel is supplied to the operation circuit 202 to inhibit synthesization of pixels.

The operation circuit 202 synthesizes read common signals and performs enlarging/interpolation in order to convert the common signals into signals of the same type as original input signals. In this manner, the operation circuit 202 outputs a video signal of even a moving object, with a synthesized tonal level without an image shift.

The video signal output from the operation circuit 202 is converted by the D/A converter 203 into an analog signal and recorded in VTR (video tape recorder) 301. If VTR 301 is a digital recording type, the D/A converter 203 is not necessary.

Figure 2:
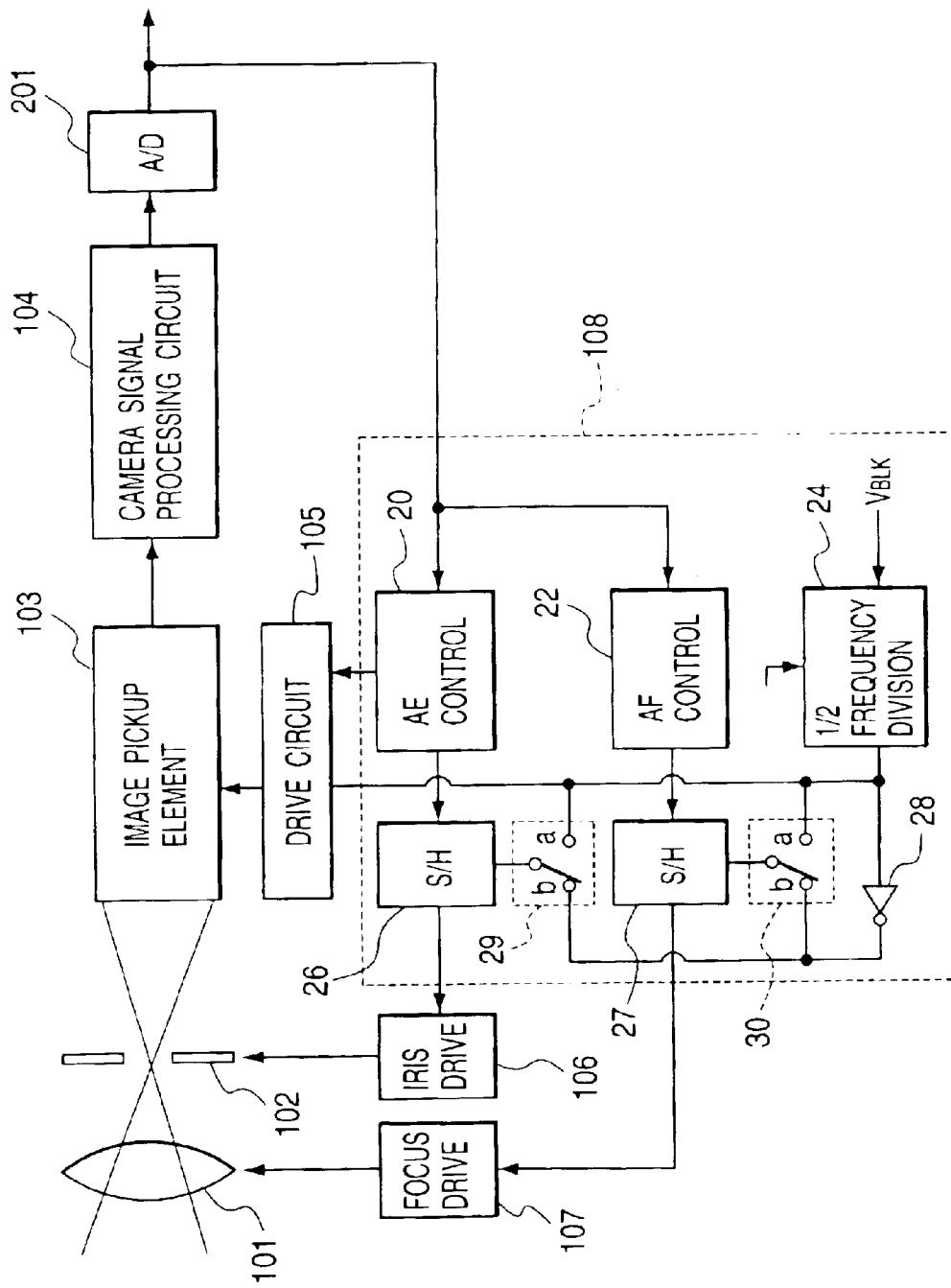
FIG. 2 is a block diagram showing the specific structure of a camera unit of VTR shown in FIG. 1.

Next, the details of the operation of the image pickup element 103 will be described. FIG. 2 is a block diagram showing a more detailed structure of the camera unit 100, and FIG. 3 is a timing chart illustrating operation of the camera unit 100 assuming that NTSC signals are used.

Figure 3:
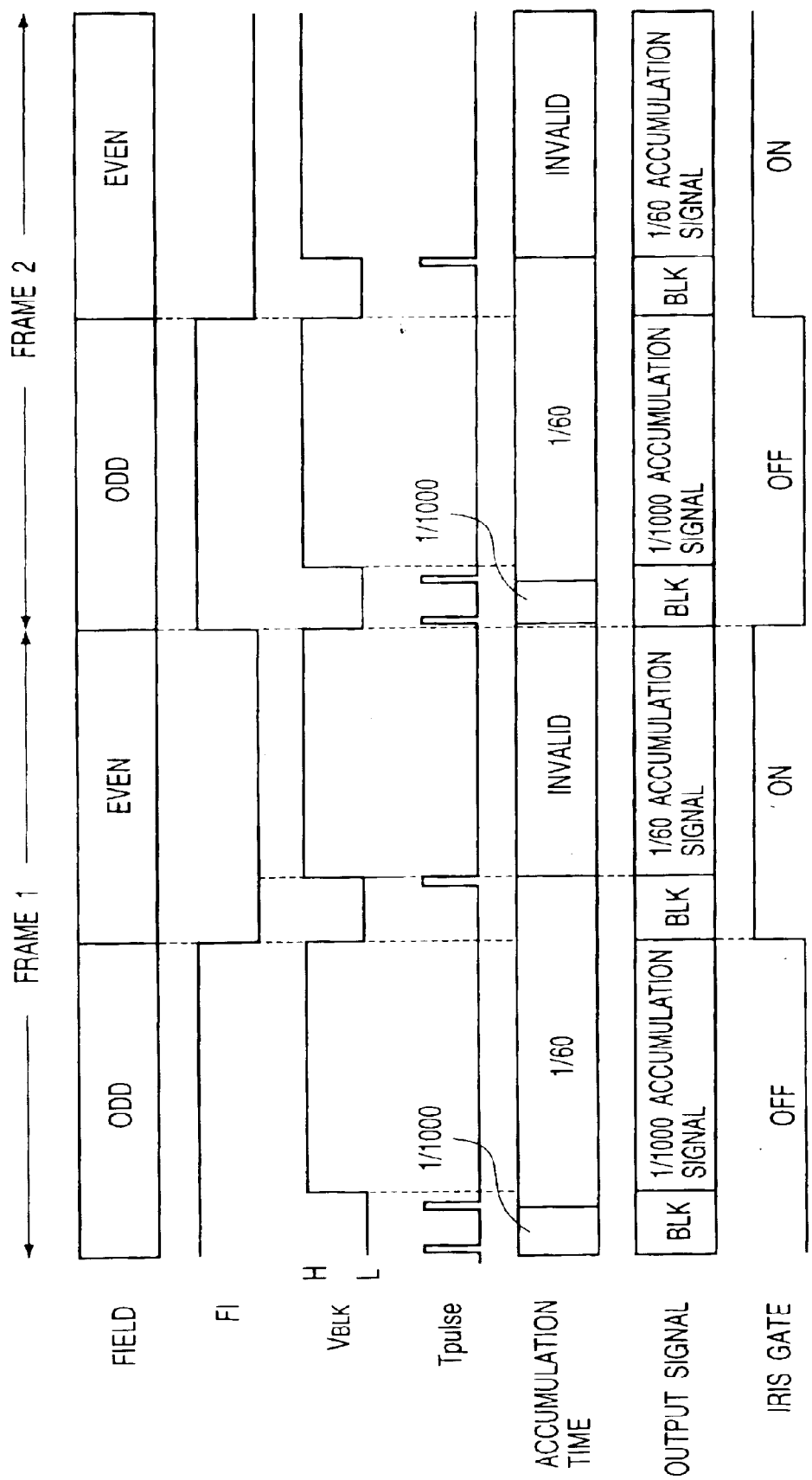
FIG. 3 is a timing chart illustrating an operation of an image pickup device.

Referring to FIG. 3, a field index signal (F1) is a signal used for discriminating between odd and even fields constituting one frame.

A $V_{BLK}$ signal is a vertical blanking signal, the period with H (high) of this signal corresponding to an effective frame and the period L (low) corresponding to a vertical blanking period.

A $T_{pulse}$ signal controls a charge accumulation time of the image pickup device 103. This $T_{pulse}$ signal is a pulse signal used for reading a pixel to be output to a vertical transfer CCD, if the image pickup device is a CCD image pickup device.

An iris gate signal is a signal designating which of a 1/1000 sec. accumulation signal and a 1/60 sec. accumulation signal is used as a standard video signal for automatic exposure to be described later.

In the example shown in FIG. 3, during the first blanking period, and during the next effective period, the 1/1000 sec. accumulation signal is output. Immediately after the 1/1000 sec. accumulation period, the substantial 1/60 sec. charge accumulation is performed, an during the next field effective period, the 1/60 sec. accumulation signal is output. In this manner, signals of different light amounts (1/1000 sec. and 1/60 sec.) are alternatively output for each field.

In FIG. 2, reference numeral 20 denotes a known AE control circuit which receives a signal (e.g., video signal) from the camera signal processing circuit 104 via the A/D converter 201 and calculates and outputs an exposure control signal. Reference numeral 22 denotes a known AF control circuit which outputs a focus control signal. Reference numeral 24 denotes a ½ frequency division circuit for lowering the frequency of the vertical blanking signal $V_{BLK}$ by a half.

Reference numerals 26 and 27 denote sample-hold circuits, reference numeral 28 denotes an inverter, and reference numerals 29 and 30 denote switches which select either an output of the ½ frequency division circuit 24 or an output of the ½ frequency division circuit 24 inverted by the inverter 28, in order to determine a sampling timing. Outputs of the sample-hold circuits 26 and 27 are applied to the iris drive circuit 106 and focus drive circuit 107, respectively, to thereby perform an automatic exposure control, an automatic focus control and the like according to those outputs.

In this embodiment, a combination of 1/1000 sec. and 1/60 sec. is used, which corresponds to a light amount change of about four steps (sixteenfold). Therefore, for example, in the case of a camera using a CCD image pickup device, for example, if an exposure control of a main object is performed by using as a reference the 1/60 sec. accumulation time in the even field, it happens frequently that the background of the even field is likely to have the "crushed white", whereas the main object in the odd field with the light amount lowered by four steps is likely to have the "crushed black". This example assumes the case wherein proper exposure is set to the background for rear light correction, and in accordance with the scene at that time, the accumulation time may be set to a value different from 1/1000 sec.

As opposed to the above embodiment CCD, a CCD having a high speed shutter function of a VOD type has been recently used. This type drains unnecessary charges in the vertical direction of a CCD substrate, and can set the shutter speed very finely. If this CCD is used, the camera drive circuit 105 can set an optimum shutter speed which is judged by the AE control circuit 20 of the control circuit 108 in accordance with a brightness difference between a main object and a background object.

As described earlier, in this embodiment, the image quality is improved by positively utilizing the "crushed white" and "crushed black" in each field. That is, a portion with the "crushed white" or "crushed black" is replaced by a corresponding portion in the other field (since exposure is different, the "crushed black" or "crushed white" is not being formed in the other field), and video signals of both the fields are synthesized to obtain a final video signal.

Figure 4:
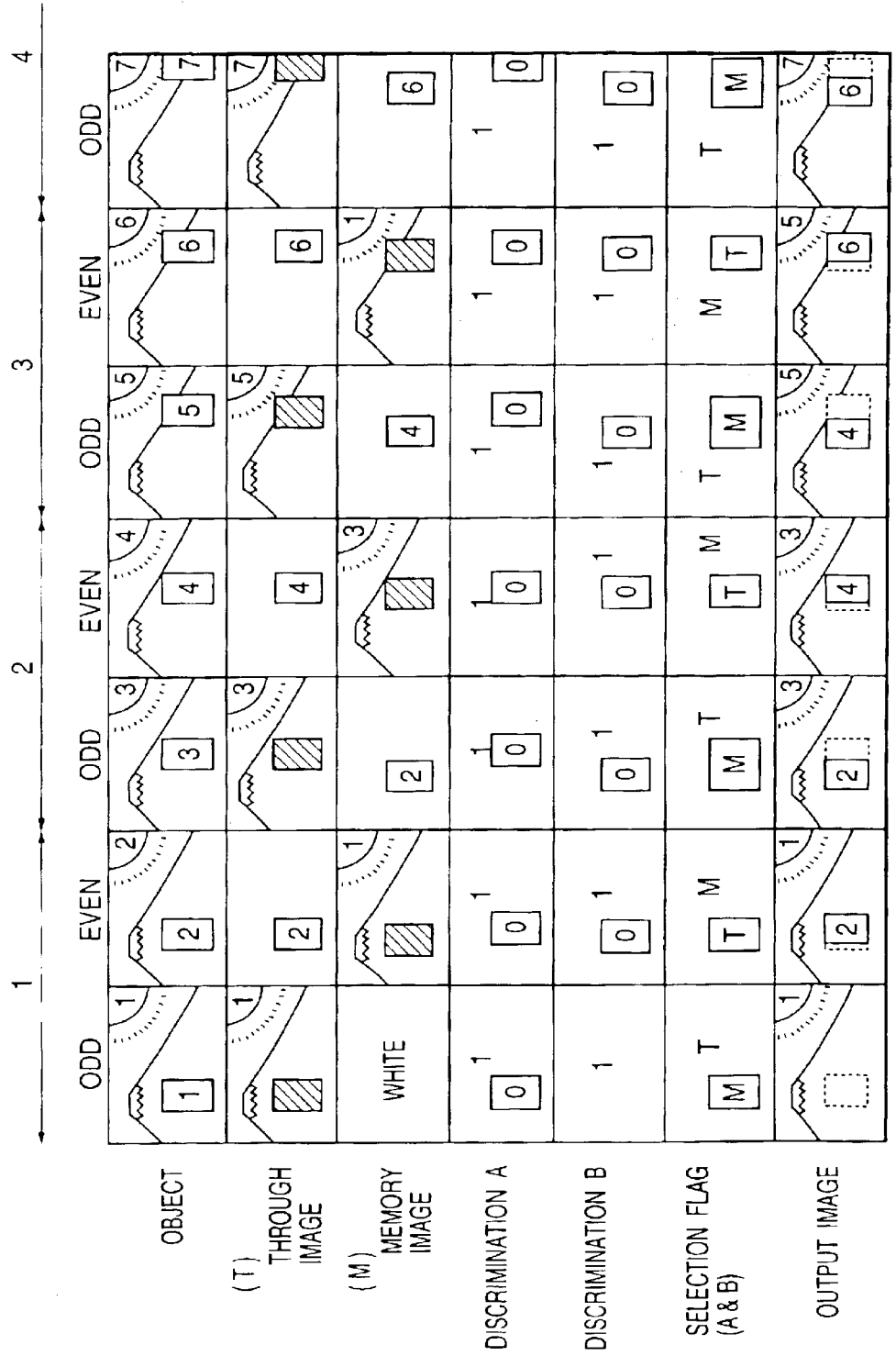
FIG. 4 is a diagram explaining a concept of image processing according to an embodiment of the invention.

The above fundamental approach will be explained with reference to FIG. 4. In FIG. 4, a main object is schematically shown as a rectangle with a vertically long side. A through image (T) shown in FIG. 4 corresponds to an image formed directly by an output of the image pickup device 103. A memory image (M) corresponds to an image formed by a preceding field image signal once stored in the image memory 204. The through image has the main object with the "crushed black" by rear light at each odd field, whereas it has the background with the "crushed white" at each even field.

Since the memory image is formed by a signal delayed by one field, the "crushed white" and "crushed black" are formed in fields different from those of the through images. Therefore, if the through and memory images are properly combined, an image of good quality without the "crushed white" and "crushed black" can be obtained. Namely, signals of the through and memory images are compared with predetermined threshold values at each field to discriminate between the "crushed white" and "crushed black" of each pixel, by setting "1" if the signal of each pixel is larger than the threshold value, and "0" if smaller.

Figures 6A, 6B:
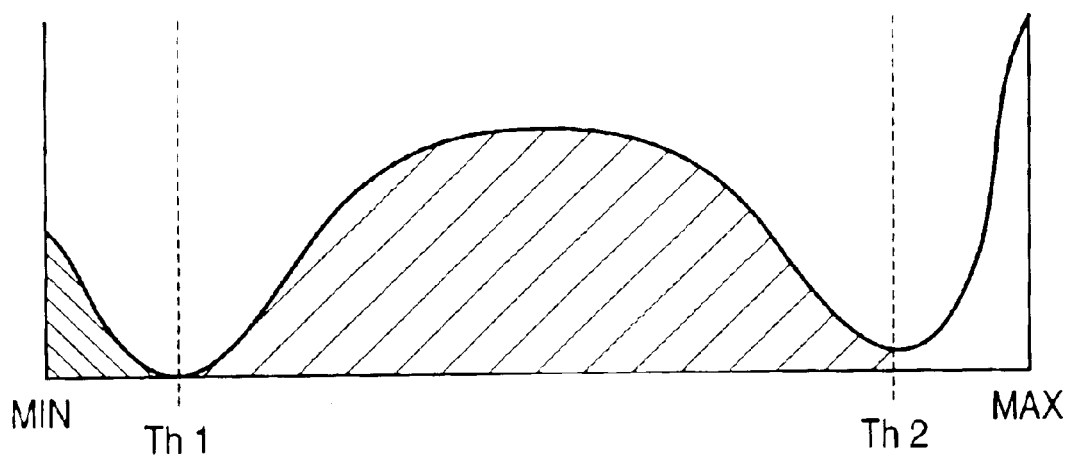
FIGS. 6A and 6B are diagrams explaining a method of determining threshold levels to be used for the discrimination between "crushed white" and "crushed black".

FIGS. 6A and 6B show the relation between threshold values, pixel brightness levels, and fields. The abscissa of FIG. 6A indicates the brightness level, and the ordinate indicates an occurrence frequency of each brightness level in one frame. As shown in FIG. 6A, a first threshold value Th1 is set so that the "crushed black" can be discriminated, whereas a second threshold value Th2 is set so that the "crushed white" can be discriminated. That is, a brightness level equal to or lower than the first threshold value Th1 is judged as the "crushed black", whereas a brightness level equal to or higher than the second threshold value Th2 is judged as the as "crushed white".

FIG. 6B shows the relation between each field and a corresponding threshold value. Since the "crushed white" and "crushed black" appear alternately in the odd and even fields, the threshold values used for the discrimination are also changed for each field.

It is possible therefore to judge which pixel in which field has the "crushed black" or "crushed white". By using the judgement results, a pixel signal having a proper exposure amount can be selected from either the through or memory image. For example, in the odd field, the through image is selected for a pixel having a logical product "1" of a judgement A and a judgement B, and the memory image is selected for a pixel having the logical product "0". In the even field, the opposite relation as above is set. In this manner, selection flags shown in FIG. 4 can be obtained.

Images synthesized in accordance with the selection flags are shown at the bottom row of FIG. 4. As shown, moving images sufficient for practical use can be obtained, by suppressing the influence of the time axis shift of each image assuming that the main object is moving at a constant speed.

Figure 5:
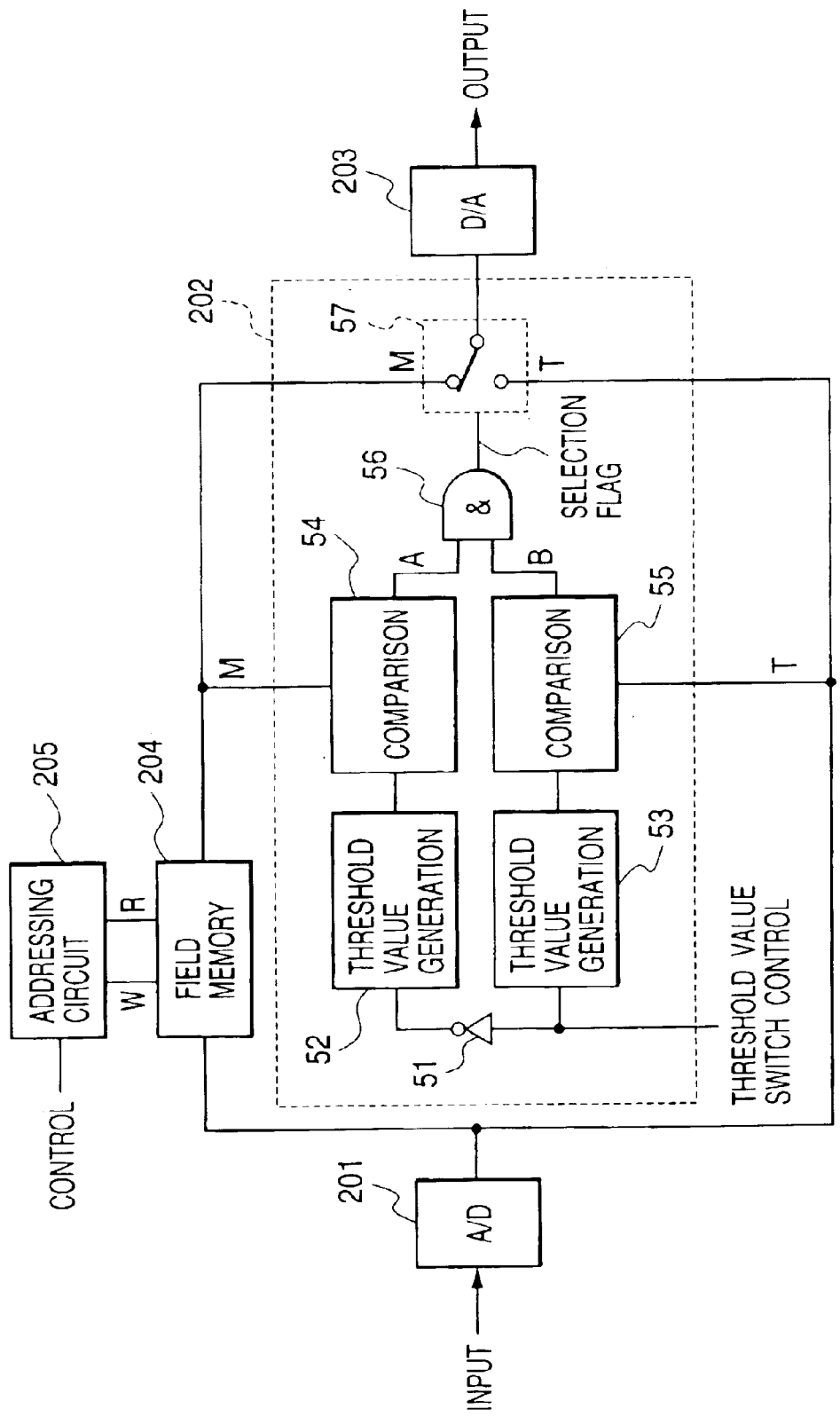
FIG. 5 is a block diagram showing the specific structure of an operation (computing) circuit of VTR shown in FIG. 1.

FIG. 5 is a block diagram showing the details of a circuit portion in the operation circuit 202 of the processing circuit 200, the circuit portion being used for the comparison with the first and second threshold values Th1 and Th2 and for the generation of the selection flags. A threshold value switch control signal alternately changes between "H" and "L" at each field, similar to an FI signal. The threshold value switch control signal is applied to a first threshold value generation circuit 53, and via an inverter 51 to a second threshold value generation circuit 52.

In accordance with the threshold value switch control signal, the first and second threshold value generation circuits generate the first or second threshold value Th1 or Th2 having the relation shown in FIG. 6B. Comparison circuits 54 and 55 compare the memory and through images with the threshold values supplied from the threshold value generation circuits 52 and 53, and output judgement signals A and B.

An AND gate 56 outputs a selection flag signal as the logical product of the judgement signals A and B.

A switch 57 selects either the memory or through image in accordance with the selection flag signal.

Figure 7A:
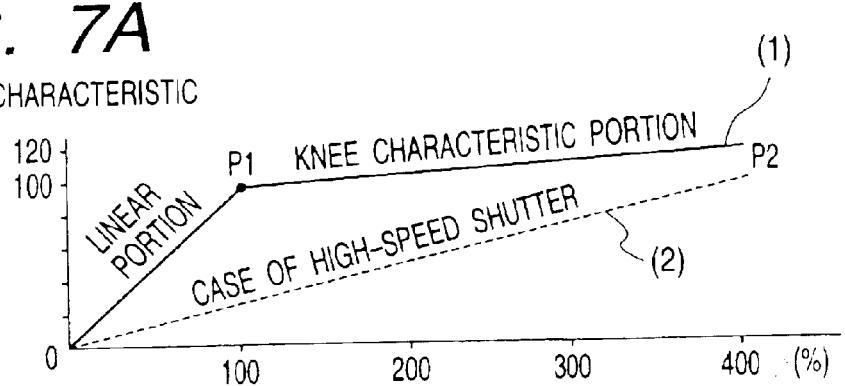
FIGS. 7A, 7B, 7C and 7D are diagrams explaining tonal level characteristics.

FIGS. 7A to 7D are diagrams explaining tonal level characteristics. A solid line in FIG. 7A shows a characteristic of a general video camera. Up to a 100% input, the input/output characteristic is linear. For an input (100 to 400%), a gentle slope called a knee characteristic appears. A transition point between the linear characteristic portion and knee characteristic portion is represented by P1. For a high speed shutter, this transition point moves to P2. It is assumed that P1 is 1/60 sec and P2 is 1/250 sec. with an exposure change of two steps.

Figure 7B:
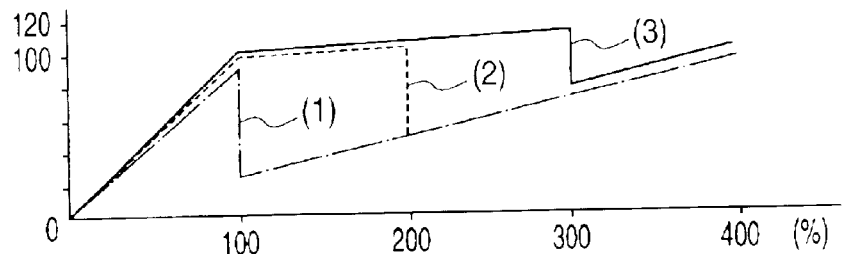
Figure 7C:
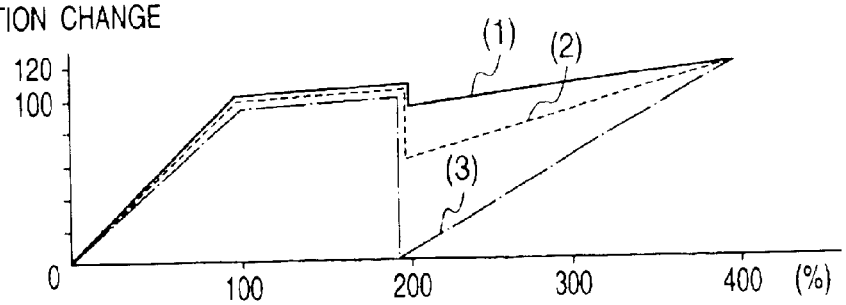
Figure 7D:
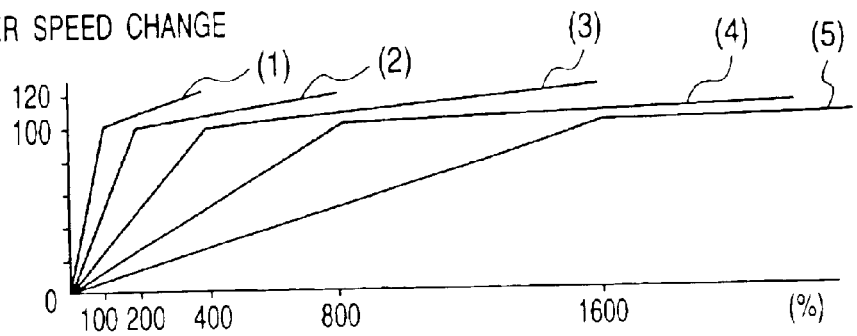

As described earlier, if the exposure amount is four steps, the shutter speed change is represented by the relation between (1) and (5) shown in FIG. 7D. (1) in FIG. 7D corresponds to 1/60 sec., (2) corresponds to 1/125 sec., (3) corresponds to 1/250 sec., (4) corresponds to 1/500 sec., and (5) corresponds to 1/1000 sec. A characteristic with a desired curve can be obtained by using two characteristic lines having different slopes.

FIG. 7B shows examples of synthesized characteristic lines in which different threshold values are used for the discrimination between the "crushed white" and "crushed black".

FIG. 7C shows characteristic lines, (1) outputting an addition average of corresponding two pixel signals, (2) outputting a selected one of two pixel signals, and (3) outputting an addition average with predetermined coefficients.

In the above example, a time resolution is substantially 30 images per second which is almost equal to a frame storage CCD image pickup device. In order to realize a time resolution almost equal to a field storage CCD image pickup device, an example of picking up two images in one field, will be described. A changed circuit portion is shown in FIG. 9, and the timing chart is shown in FIG. 8.

Principally, signals are read from the image pickup device 103 at a speed higher than a general video rate, and the read signals are converted in a time axis into a normal rate. First and second field memories 90 and 91 each have a memory capacity of one field image information. The first field memory 90 delays a 1/1000 sec. accumulation signal in order to synchronize it with a 1/120 sec. read signal. The second field memory 91 performs a twofold time expansion in order to change the 1/120 sec. video signal to an NTSC signal of 1/60 sec.

Figure 9:
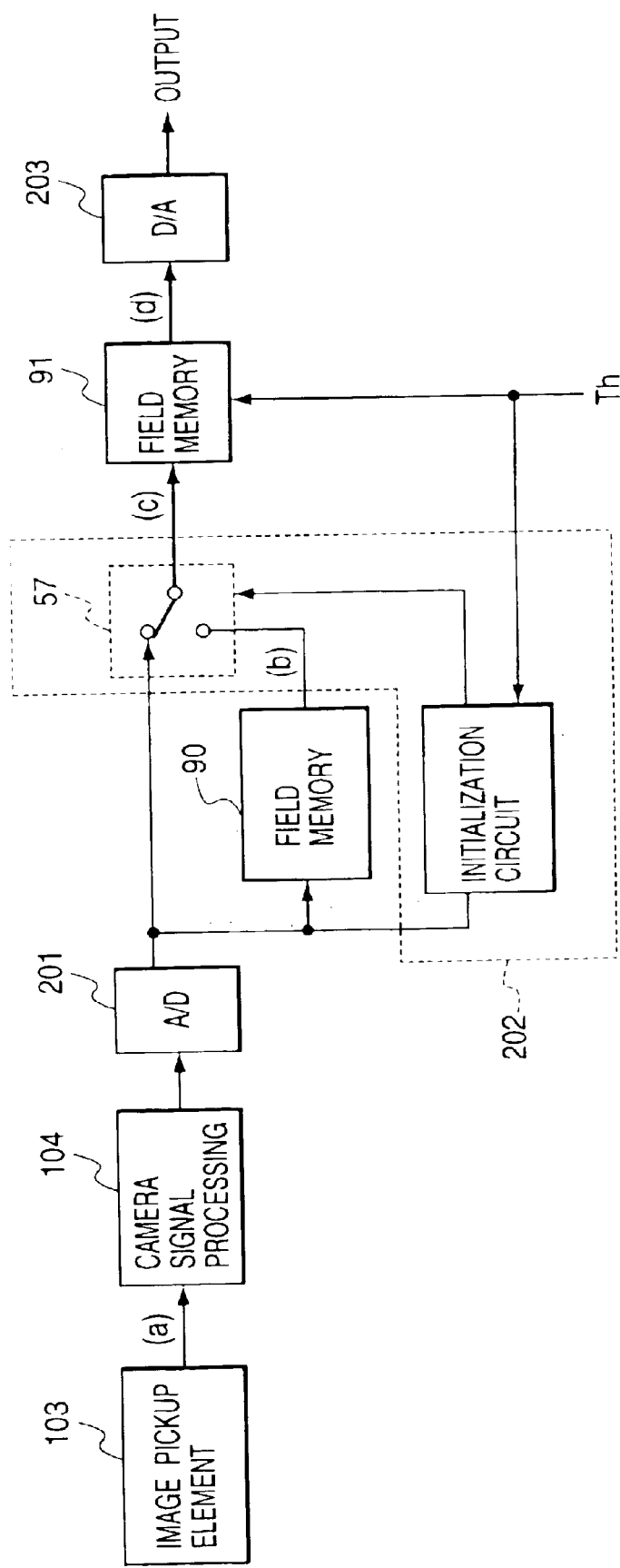
FIG. 9 is a block diagram showing the partial structure of the camera unit.

Arrows (a) to (d) shown in FIG. 9 correspond to signals (a) to (d) shown in FIG. 8. The image pickup device 103 capable of performing the above operation may be a MOS solid image pickup device of an XY addressing type.

Figure 10:
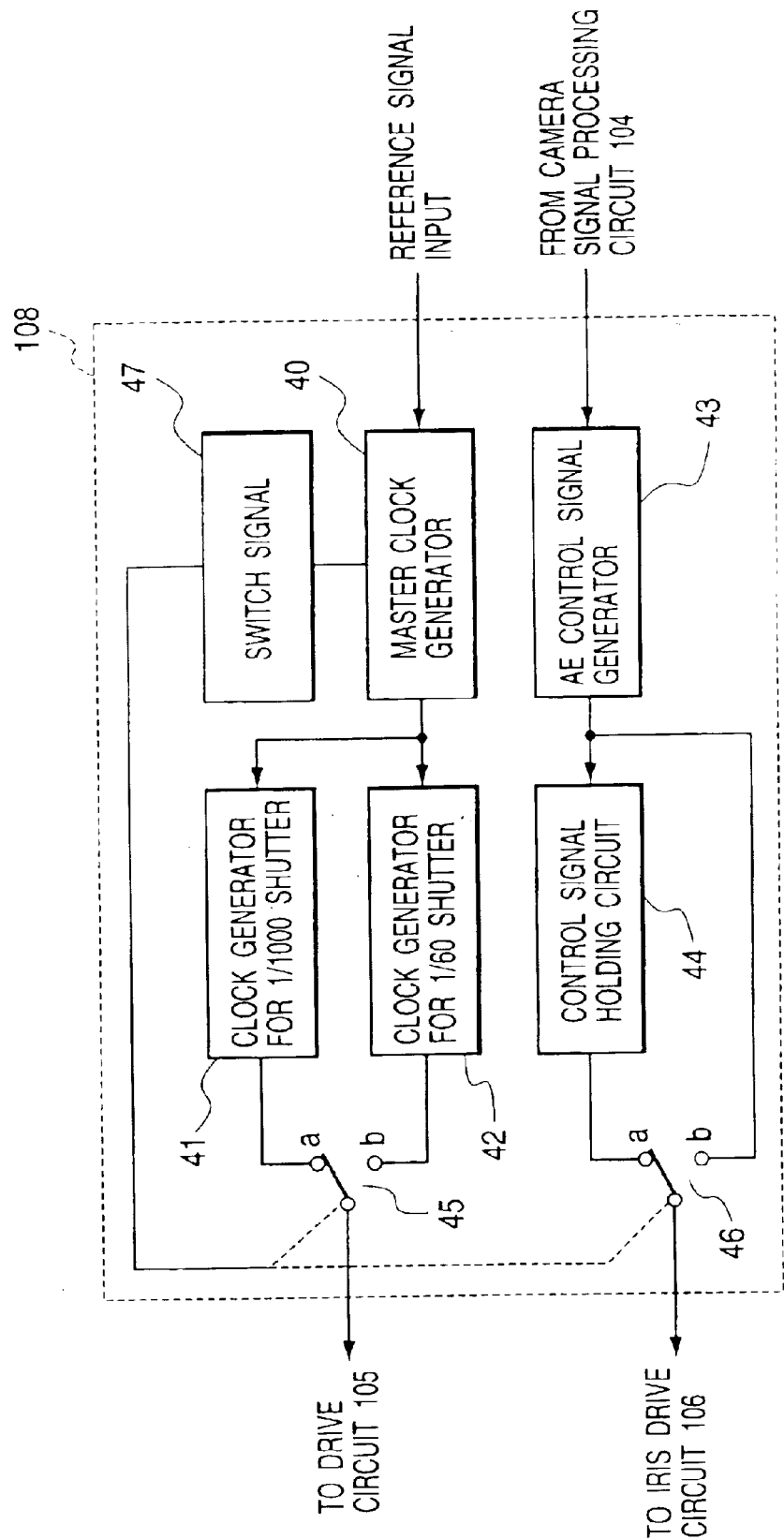
FIG. 10 is a block diagram showing an example of a control circuit of VTR shown in FIG. 1.

Next, another example of the details of the control circuit 108 will be described with reference to FIG. 10. A master clock generator 40 generates an internal master clock to be used by the control circuit 108, in accordance with an external reference signal.

A clock generator 41 for a 1/1000 sec. shutter generates a high speed clock from the master clock supplied from the master clock generator 40. A clock generator 42 for a 1/60 sec. shutter generates a low speed clock from the master clock supplied from the master clock generator 40.

A switch 45 changes its contact point alternately at each field to alternately apply the outputs of the clock generators 41 and 42 to the drive circuit 105.

An AE control signal generator 43 generates an AE control signal for the iris control, in accordance with the video signal supplied from the camera signal processing circuit 104. A control signal holding circuit 44 holds the AE control signal during one field period.

A switch 46 changes its contact point alternately at each field to alternately apply the AE control signal of the AE control signal generator 43 and the AE control signal held by the control signal holding circuit, to the iris drive circuit 106. A switch signal generator 47 controls the switching of the switches 45 and 46 which are synchronously switched.

In the above example, clock generators for generating high and low speed clock pulses are provided, and the high and low speed clock pulses are switched in response to a signal of the switch signal generator output at each field. Accordingly, the circuit structure and operation can be simplified, which is particularly suitable for moving images.

In the above description, images are formed at different exposure amounts by changing the shutter speed. If a high speed iris function is available, the iris may be changed at high speed. Alternately, a light reducing filter using a spatial light modulating device such as PLZT may be electrically controlled.

As described above, various calculations may be made in this embodiment. An example of image synthesization to be performed with a simple process and more effective simple addition calculation will be described.

Figure 11A:
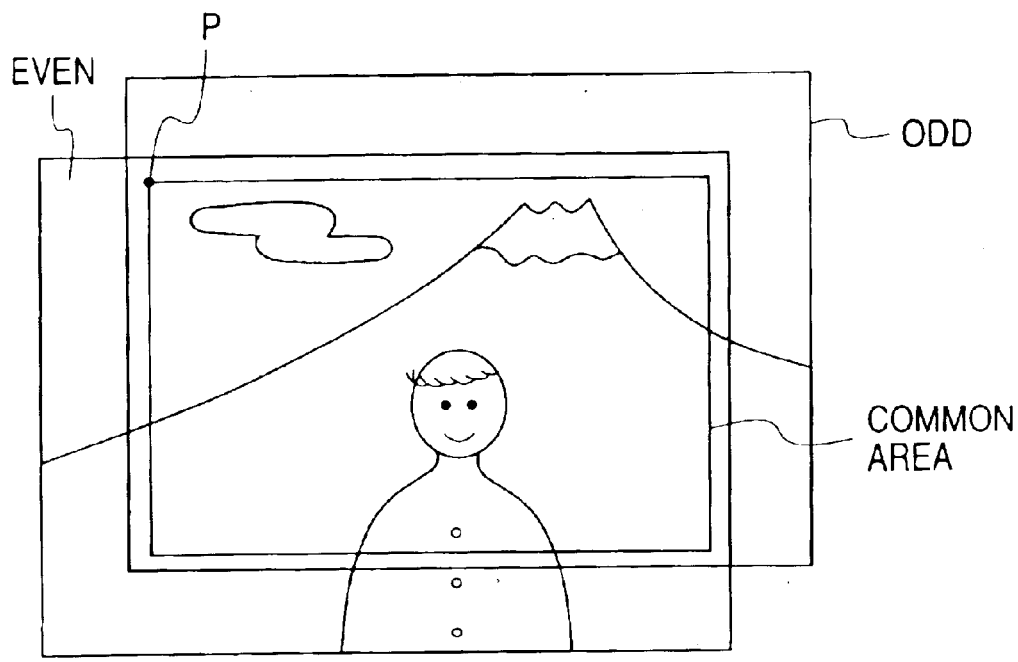
FIGS. 11A, 11B and 11C are diagrams explaining a concept of image shifts according to another embodiment.
Figure 11B:
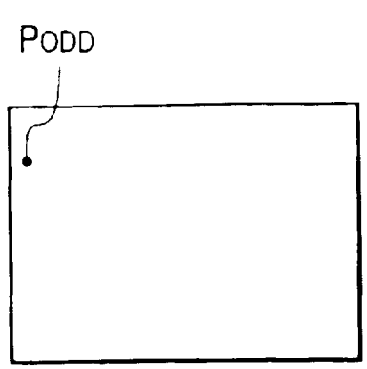
Figure 11C:
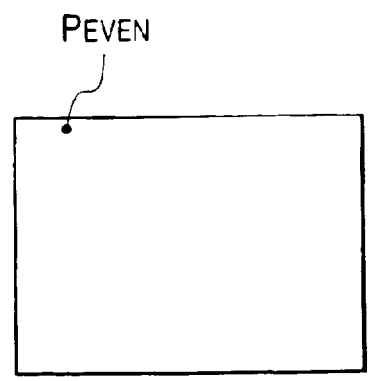

FIGS. 11A to 11C are conceptual diagrams explaining an image shift of an object in the two images (odd and even field images) relative to a display screen (image pickup device 103).

It is assumed that the upper left in the common area of the even and odd images is a memory read start point P. Then, a point $P_{ODD}$ shown in FIG. 11B is the image memory read start point for the odd image, and a point $P_{EVEN}$ shown in FIG. 11C is the image memory read start point for the even image. By using these start points, video signals with no image shift can be generated for the common area of the even and odd images.

Figure 12:
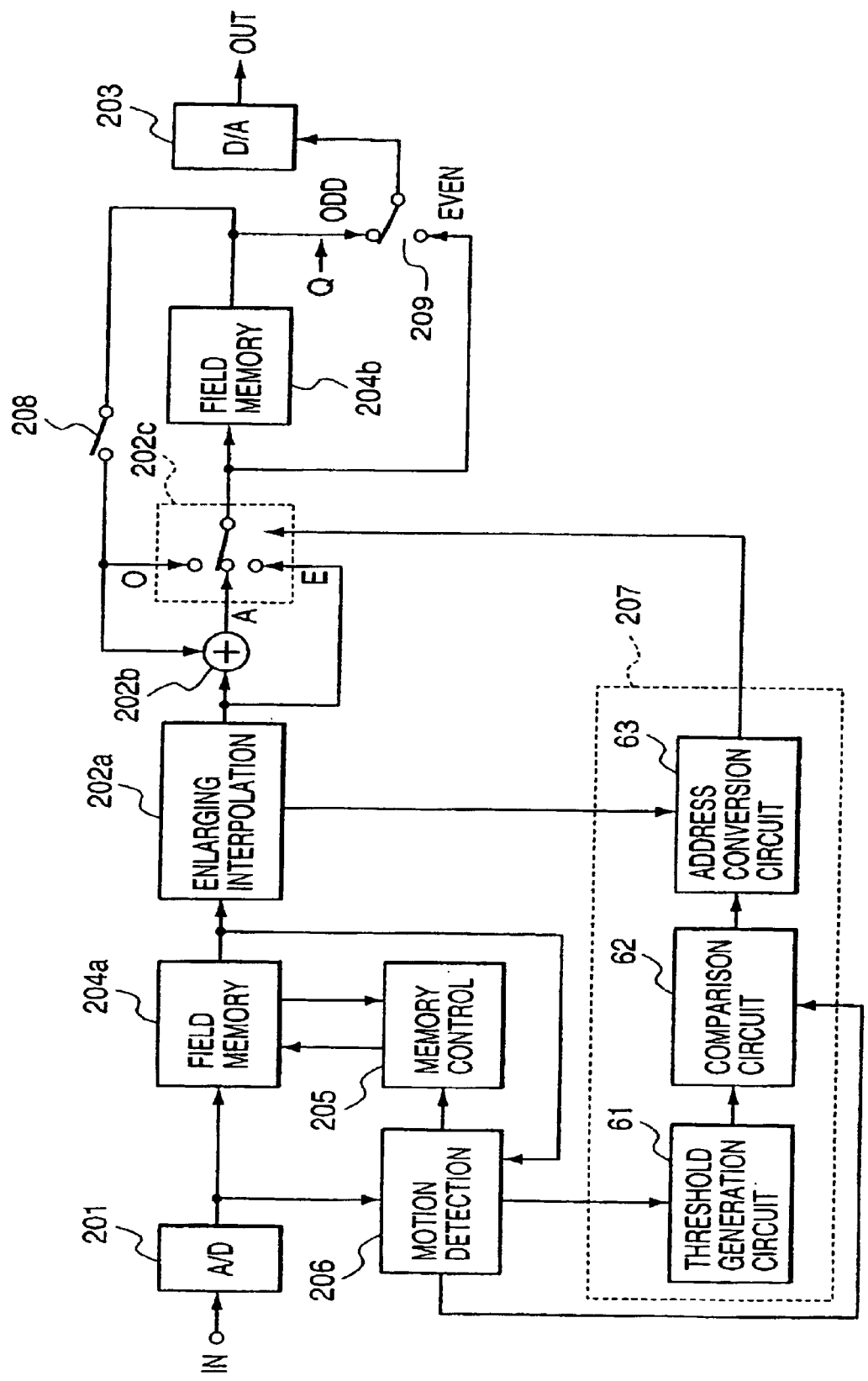
FIG. 12 is a block diagram showing the specific structure of the VTR of the embodiment of FIGS. 11A to 11C.

A specific example of the structure shown in FIG. 1 applied to this embodiment is shown in FIG. 12.

Referring to FIG. 12, an input video signal is converted into a digital signal by the A/D converter 201, and supplied to a first field memory 204a and a motion detection circuit 206.

An output of the first field memory 204a is supplied to another input terminal of the motion vector detection circuit 206. The motion vector detection circuit 206 detects motion information of each pixel from two video signals having one field time delay, and in accordance with this motion information, generates an image shift correction signal. This image shift correction signal is supplied to the memory control circuit 205 which controls the first field memory 204a in accordance with the image shift correction signal.

The image shift correction signal generated by the motion vector detection circuit 206 is supplied also to the motion vector comparison circuit 207. The motion vector comparison circuit 207 is constituted of a threshold generation circuit 61, a comparison circuit 62, an address conversion circuit 63, and the like. The image shift information output from the motion vector detection circuit 206 is supplied to the threshold generation circuit 61 and comparison circuit 62. The threshold generation circuit 61 generates a threshold value to be used for the judgement of an object, and supplies it to the comparison circuit 62.

The comparison circuit compares the threshold value with the motion information of each pixel to judge whether the motion of each pixel is caused by hand vibration or by some other motion. In other words, it is judged whether the motion of each pixel is caused by the motion of the object itself, and an address of a pixel which was judged as having a motion other than by hand vibration, is supplied to the address conversion circuit 63.

In accordance with interpolation information supplied from an enlarging/interpolation circuit 202a, the address conversion circuit 63 converts an address of the pixel which was judged as having a motion other than by hand vibration, into an address after enlarging/interpolation, generates a selection signal for inhibiting the pixel to be synthesized and selecting the pixel in the field with a proper exposure, and supplies the selection signal to a next stage selector 202c.

The video signal of the common area shown in FIG. 11A is output from the first field memory 204a and converted into a signal of the original type (e.g. NTSC signal), same as the input signal.

The smaller the common area, the larger the enlarging factor becomes. Regardless of what enlarging factor is used, the video signal is converted into a signal of the original type and stored via an adder 202b into a second field memory 204b.

Assuming that the video signal stored in the second field memory 204b is of the odd field, the video signal of the next even field is output from the enlarging/interpolation circuit 202a and added to the corresponding video signal by the adder 202b for each pixel.

The addition signal is supplied via the terminal A of the selector 202c and via the EVEN terminal of another selector 209 to the D/A converter 203. The addition signal is also supplied via the terminal A of the selector 202c to the second field memory 204b. During the next odd field, new odd field information is stored in the second field memory 204b while the same video signal is supplied to the D/A converter 203 via the ODD terminal of the selector 209 through a read-modify-write operation.

A switch 208 is open for the odd field and closed for the even field. While the new odd field information is written in the second field memory, the adder 202b is made through by connecting to the terminal E.

The terminal A of the selector 202c is supplied with the addition signal, the terminal O is supplied with the odd field information output from the second field memory 204b, and the terminal E is supplied with the even field information. If the selection signal from the motion vector comparison circuit 207 indicates that a pixel has a motion caused by hand vibration, the addition signal is selected, whereas if the selection signal indicates that a pixel has a motion other than by hand vibration, a video signal of either the even or odd field having a proper exposure is selected. The selected signal is supplied to the next stage selector 209 and second field memory 204b. A video signal generated in the above manner is output from the D/A converter 203 in the form of an analog signal, same as the original input signal.

Figure 13:
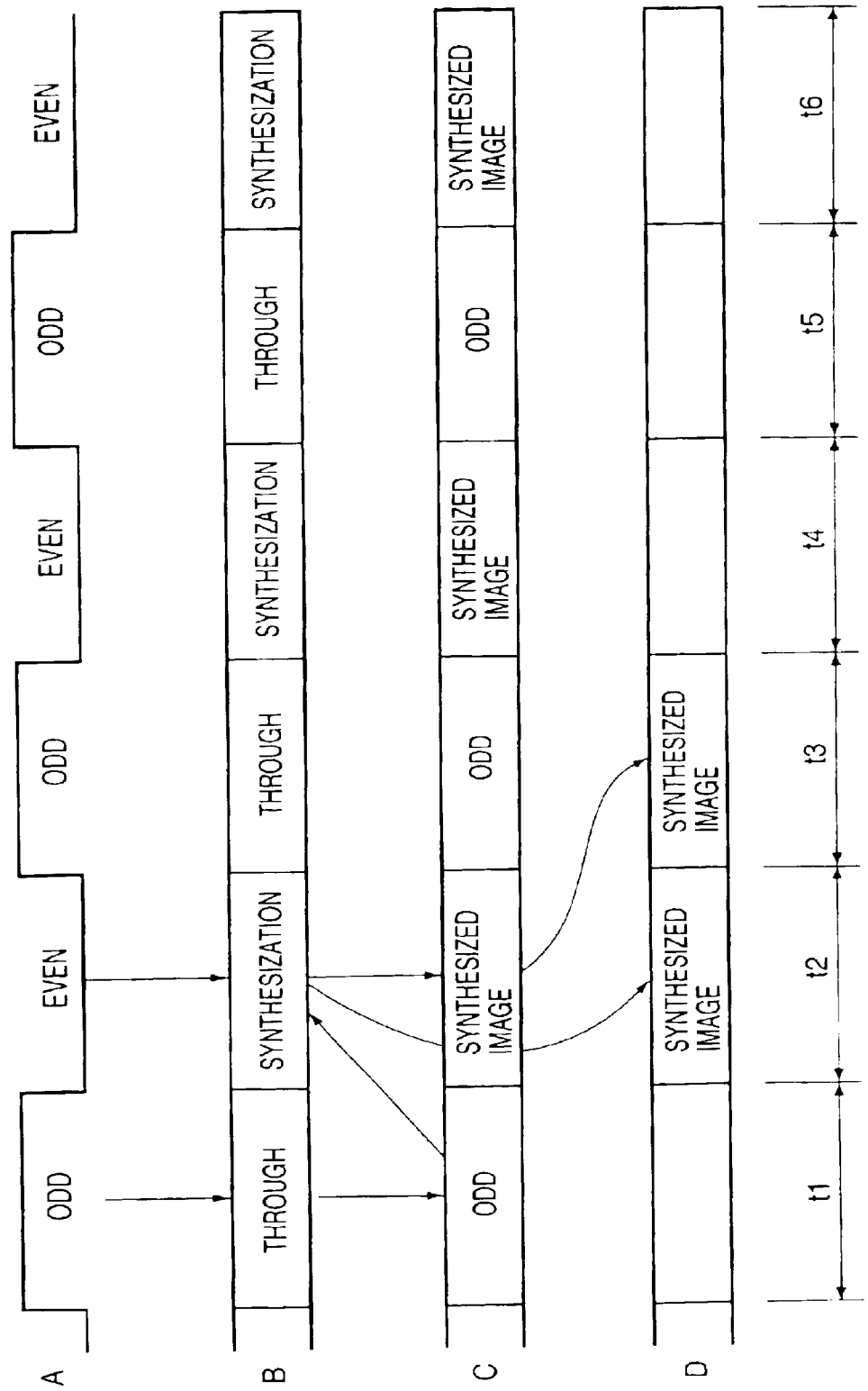
FIG. 13 is a timing chart illustrating the operation of the VTR of the embodiment of FIGS. 11A to 11C.

The operation of the above-described processes is illustrated in the timing chart of FIG. 13.

In the timing chart shown in FIG. 13, a signal indicated at A is a discrimination signal between the odd and even fields and corresponds to an output timing of the enlarging/interpolation circuit 202a.

A signal indicated at B shows an open/close timing of the switch 208. The function of the adder 202b changes with this open/close of the switch 208. If the switch 208 is open, the signal output from the enlarging/interpolation circuit 202a passes through the adder 202b, whereas if the switch 208 is close, the signal is added by the adder 202b.

A signal indicated at C shows a write timing of the second field memory 204b. During the odd field indicated by the signal A, the odd field image signal is written in the second field memory, whereas during the even field indicated by the signal A, the video signal selected by the selector 202c according to the read-modify-write operation is written again in the second field memory 204b at the same addresses.

A signal indicated at D shows a switching timing of the selector 209. Image information synthesized from the odd field image information during a period t1 and the even field image information during a period t2 is output during a period t2, and the same synthesized image information is again read and output during a period t3.

In synthesizing an image, if it is judged that a pixel has a motion other than by hand vibration, a video signal of either the even or odd field having a proper exposure is selected, as a time axis shift of the image may be feared. However, this does not pose any practical problem, as described with an example of a calculation process for a synthesized image shown in FIG. 4.

As described previously, in this embodiment, each process is performed in the unit of two fields. A line interpolation process may be interchanged between the odd and even fields to make it compatible with interlacing and reduce so-called field interference. In order to reduce this field interference, a line interpolation circuit is inserted at a point Q between the second field memory 204b and selector 209.

The invention is applicable to any modification or alteration of the above-described embodiment without departing from the scope and spirit thereof.

The present invention may be applied to a system constituted by a plurality of apparatuses (e.g., a host computer, interface units, a reader, a printer, and the like) or to a system constituted by a single apparatus.

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storage such program codes, also constitute the present invention.

The storage medium storing such program codes may be a floppy disk, a hard disk, an optical disk, a magneto-optical disk, a CD-ROM, a magnetic tape, a nonvolatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

As described so far, according to the present invention, a plurality of images are sequentially picked up at different exposure amounts, and an apparent dynamic range of a video signal is increased by synthesizing one image from a plurality of images. In such a case, if a difference between a motion vector between pixels in a plurality of images and a motion vector between images is larger than a predetermined threshold value, the pixel is not used for synthesization in order to increase a substantial dynamic range. For example, even under rear light, not only the main object but also the background can have images at proper exposures. Even a video signal having an image shift caused by a motion of an object itself or hand vibration can be subjected to a practically usable dynamic range increasing process, to thereby prevent double or triple images.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    an image sensor that picks up an image corresponding to an optical image, and produces a first field image signal having a first exposure and a second field image signal having a second exposure different from the first exposure;
    a synthesizing circuit that synthesizes the first field image signal and the second field image signal to form a third image signal having a wider exposure range than the first or second field image signal;
    a switching circuit that selectively outputs one of the first field image signal having the first exposure and the third image signal having the wider exposure range than the first field image signal;
    a detecting circuit that detects an amount of motion information between the first field image signal and the second field image signal to produce a detection signal in comparison with a predetermined threshold level; and
    a control circuit that controls said switching circuit to select one of the first field image signal having the first exposure and the third image signal having the wider exposure range than the first field image signal in response to a result of said detecting circuit.

2. An image pickup apparatus according to claim 1, wherein the first field image signal and the second field image signal are sequential signals.

3. An image pickup apparatus according to claim 1, wherein the first field image signal and the second field image signal are different in exposure.

4. An image pickup apparatus according to claim 1, wherein the first field image signal and the second field image signal are produced with different exposure periods.

5. An image pickup apparatus according to claim 1, wherein said synthesizing circuit selects a proper exposure part of the first field image signal and a proper exposure part of the second field image signal to produce one synthesized image signal.

* * * * *

UNITED STATES PATENT AND TRADEMARK OFFICE
CERTIFICATE OF CORRECTION

PATENT NO. : 6,952,234 B2
DATED : October 4, 2005
INVENTOR(S) : Kazuhiko Hatano

It is certified that error appears in the above-identified patent and that said Letters Patent is hereby corrected as shown below:

Column 3,
Line 21, "forming a" should read -- forming --.

Column 10,
Line 16, "close" should read -- closed --.

Signed and Sealed this

Thirtieth Day of May, 2006

JON W. DUDAS
*Director of the United States Patent and Trademark Office*